May 19, 1970      J. A. FORSS      3,512,643
CONTROL DEVICE FOR WATER TREATMENT APPARATUS
Filed Dec. 23, 1968      2 Sheets-Sheet 1
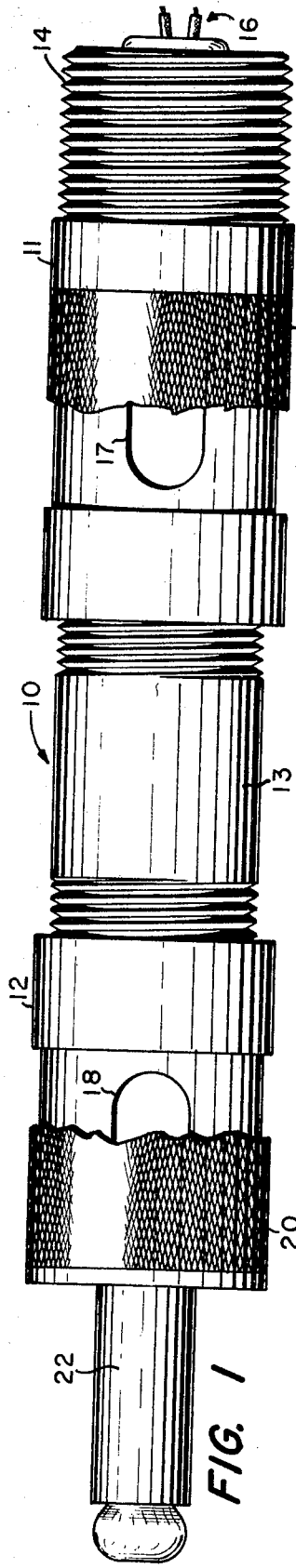
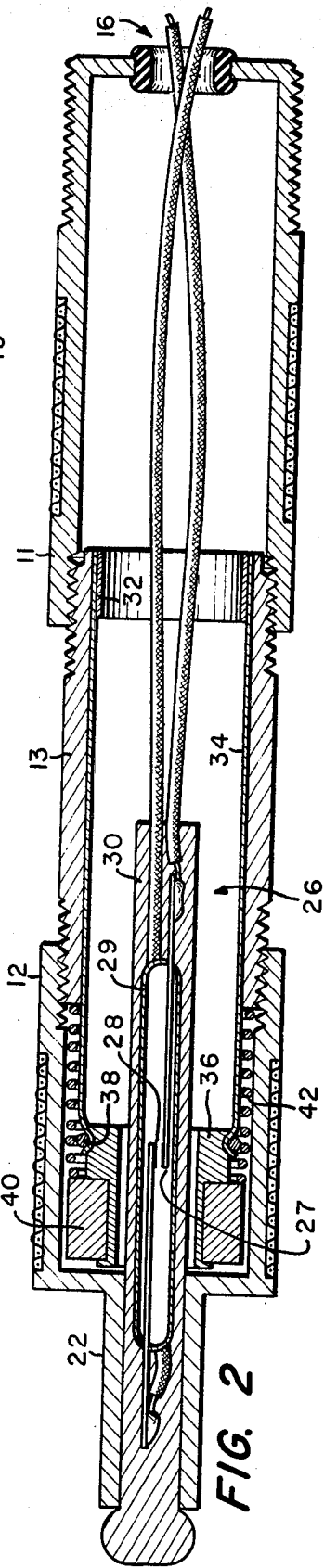
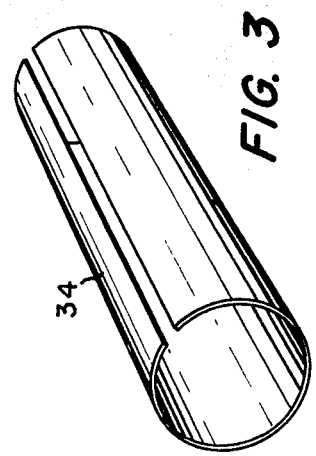
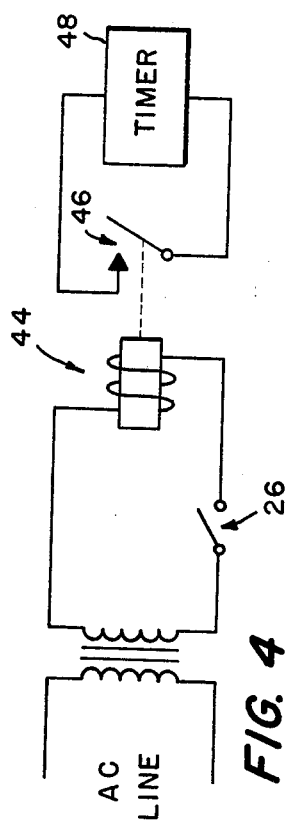
INVENTOR.
JOHN A. FORSS
BY *Oliver F. Anett*
ATTORNEY.

May 19, 1970   J. A. FORSS   3,512,643
CONTROL DEVICE FOR WATER TREATMENT APPARATUS
Filed Dec. 23, 1968

INVENTOR.
JOHN A. FORSS
BY
*Oliver F. Arrett*
ATTORNEY.

United States Patent Office 3,512,643
Patented May 19, 1970

3,512,643
CONTROL DEVICE FOR WATER TREATMENT APPARATUS
John A. Forss, Minnetonka, Minn., assignor to Honeywell Inc., Minneapolis, Minn., a corporation of Delaware
Filed Dec. 23, 1968, Ser. No. 786,039
Int. Cl. B01d 15/06
U.S. Cl. 210—96   10 Claims

ABSTRACT OF THE DISCLOSURE

A water softener control device including a body of ion exchange material which contracts upon exposure to hard water changing the position of a magnet to operate a reed switch.

SUMMARY OF THE INVENTION

This invention relates to an improved control device of the type disclosed in U.S. Pat. 3,250,392, which issued to James R. Luck on May 10, 1966. These devices are used primarily for controlling the operation of water softeners. The devices include a sensing element, which undergoes a dimensional change when the water to which it is exposed changes in ionic content, for operating a switch thereby controlling the water softener. The sensing element may be a body of ion exchange material having a normal first size when exposed to soft water and which contracts to a smaller second size when exposed to hard water. The dimensions of the sensing element undergo reversible changes between these two sizes depending upon whether the element is exposed to hard or soft water.

Specifically, this invention is directed to an improved switch and actuator arrangement for the control device wherein a reed switch is operated by a magnet. The improved arrangement provides a simple, dependable, water impervious structure. In a preferred embodiment, a pair of screens are used to cover the water inlets and outlets of the device; a ceramic magnet is used to increase the life of the ion exchange material, and double-walled heat shrink tubing is used to encapsulate and positionally support the switch arrangement in the control device housing.

DESCRIPTION OF THE DRAWING

FIG. 1 is a side elevation of a device according to the invention with portions broken away.

FIG. 2 is a sectional view of the device shown in FIG. 1.

FIG. 3 is a perspective view showing a detail of the device of FIGS. 1 and 2.

FIG. 4 is a schematic diagram of an electrical circuit utilizing the invention.

DESCRIPTION OF THE PREFERRED EMBODIMENT

Figure 7A:
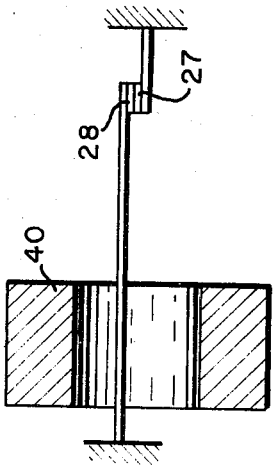
FIGS. 7a and 7b are fragmentary views of another modified magnetic circuit, also showing the magnet in two different positions.

Referring to FIG. 1, a control device according to this invention comprises an elongated cylindrical housing generally indicated at 10 having end portions 11 and 12 threaded onto a center portion 13. In the alternative, housing 10 may be an integral body consisting of a single piece part. Housing 10 is preferably an inert, non-conductive material, such as a plastic of the Nylon type (a polymeric amide) or the Cycolac type (an acrylonitrile-butadiene-styrene).

End portion 11 is exteriorly threaded at one end as shown to provide for mounting in a water softener (not shown). For example, by means of threads 14, the control device may be attached to a riser pipe or similar conduit (not shown) and inserted into a water softener bed to a predetermined position at which it will monitor the condition of water flowing through the softener. Electrical leads 16 extend through the conduit to the exterior of the water softener where they may be connected to an appropriate utilization means, such as the arrangement described hereinbelow in connection with FIG. 4.

Water inlet means comprising at least one elongated opening 17 is formed in the wall of end portion 11 to provide for the entrance of water into the device. Water outlet means comprising at least one elongated opening 18 is formed in the wall of end portion 12 to provide for the exiting of water from the device.

A pair of screens 19 and 20 cover openings 17 and 18 respectively. The screens may be of Monel metal (a nickel copper alloy) for example and are attached to housing 10. Inlet screen 19 is preferably of a finer mesh than outlet screen 20. For example, screen 19 may be 100 x 100 mesh, i.e., 100 wires per square inch with 0.0055 openings, while screen 20 may be 50 x 50 mesh, i.e., 50 wires per square inch with 0.011 openings. It is desirable that the inlet screen be of a finer mesh than the outlet screen to prevent particles from entering the device. Therefore, if a particle having a size smaller than the mesh of the inlet screen gains entrance, its escape is facilitated by the fact that the mesh of outlet screen 20 is larger than that of the inlet screen 19. End portion 12 also carries an axial cylindrical extension 22, the purpose of which will be described hereinbelow.

Referring now to FIGS. 2 and 3, a reed switch, generally indicated at 26 and comprising a pair of normally open electrical contacts 27 and 28, is encapsulated in a glass container 29 and carried inside end portion 12. Reed switch 26 is shown further encapsulated in a body of material 30 which consists of a length of double-walled, heat-shrinkable plastic tubing manufactured from specially formulated polyolefin materials which are subjected to massive doses of electron beam radiation. This treatment results in a selectively cross-linked structure whose outer cross-linked wall section has an elastic memory which allows it to shrink without melting when exposed for a few seconds to high temperatures, such as 130° C. The non-cross-linked inner wall melts during heating and is forced tight against the component it surrounds, such as the reed switch, by the shrinking outer wall. Upon cooling, the entire mass becomes a rigid tough homogeneous molding. Such a material is commercially available from the Raychem Corporation. As shown, reed switch 26 is, placed inside heat-shrink tubing 30 to which heat is then applied in order to encapsulate the switch. After encapsulation, the molded assembly is placed inside end portion 12 and one end of the molding is inserted through extension 22 such that a portion of the tubing 30 protrudes exteriorly therefrom. This portion is then subjected to heat to deform it. Consequently, the reed switch and heat-shrink tubing are staked and supported in a predetermined position within end portion 12. Prior to encapsulation, the electrodes of the reed switch are contacted by electrical leads 16 which are arranged to exit from one end of the plastic heat-shrink tubing, as shown and to also exit from one end of the device, as shown.

Axially positioned inside housing 10 and fastened to one end by a pressure fit ring 32 is a sensing element 34 which takes the form of a body of ion exchange material. Body 34 is a flat sheet which is rolled into a semitubular-like or cylindrical configuration as schematicelly indicated in FIG. 3. Materials of this type are described in the aforementioned Luck patent and need not be described here. Body 34 is fastened at its other end to bushing 36 by means of spring clip 38. Bushing 36 is fastened to an apertured, ring shaped magnet 40 which axially encircles reed switch 26 and is adapted to move back and forth over the switch. Magnet 40 is preferably of a ceramic material such as barium carbonate and iron oxide which has been processed to provide the desired shape and magnetic characteristics. Suitable materials and shapes are commercially available and are well known. The advantage accruing through the use of a ceramic magnet lies primarily in the fact that it does not readily release iron ions into solution, which ions have been found to detrimentally affect most ion exchange materials causing them to prematurely lose their responsivity to hard water. With ceramic magnets this problem has been obviated.

Magnet 40 is shown biased toward the left such that the normally open switch contacts 27 and 28 are positioned to the side of the magnet proximate body 34 when it is at its normal size. This relative positioning between the magnet and switch contacts is maintained by means of biasing spring 42 which rests against the end of housing portion 13 and the shoulder of magnet 40 as shown. Additional adjustment of the relative positions of magnet 40 and switch contacts 27 and 28 may be obtained in this embodiment by rotating portions 12 and 13.

In operation, with water entering inlet 17 and flowing through the device to exit at outlet 18, magnet 40 remains in the position shown as long as the water is soft and body 34 retains its normal size. However, as hard water flows through the control device, signifying exhaustion of the water softener body 34 contracts to a smaller second size pulling magnet 40 to a position such that it encircles normally open switch contacts 27 and 28 and causes them to close due to the magnetic circuit existing between the magnet and the contacts.

The device may be connected to a utilization means of the type schematically indicated in FIG. 4. When switch 26 closes, relay 44 is energized to close switch 46 thereby activating a suitable timer or schedule mechanism 48. Such timer mechanisms or regeneration schedulers are well known in the art and need not be described. Since the dimensional change of sensing element 34 is reversible, the element will expand to its normal larger size when brined and rinsed with soft water, repositioning magnet 40 at the position shown in FIG. 2 and allowing switch 26 to open thereby de-energizing relay 44 and re-establishing normal operation of the water softener until it is again exhausted.

Figure 5A:
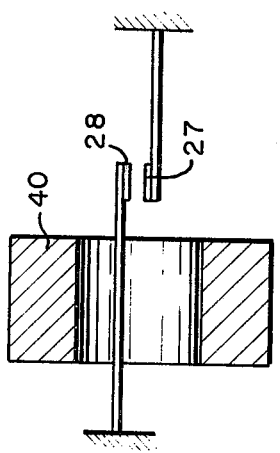
FIGS. 5a and 5b are fragmentary views of the magnetic circuit of the device shown in FIGS. 1 and 2 showing the magnet in two different positions with respect to the switch.
Figure 5B:
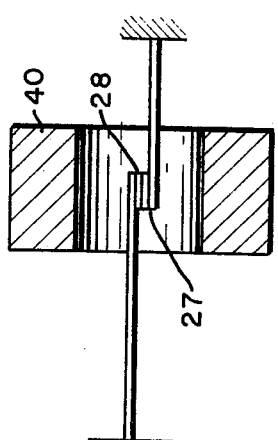

Several relative positional arrangements for magnet 40 and switch contacts 27 and 28 are possible. For example, the relative positioning described in connection with FIG. 2 is shown in FIGS. 5a and 5b. In these figures, magnet 40 is positioned such that when sensing element 34 contracts it pulls the magnet from the normal position shown in FIG. 5a to the position shown in FIG. 5b so that contacts 27 and 28 are placed inside the aperture of the magnet and are closed due to the completion of the magnetic circuit set up between the switch contacts and the magnet.

Figure 6A:
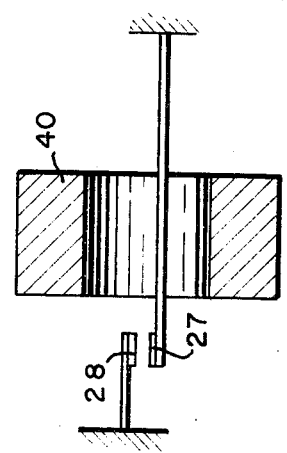
FIGS. 6a and 6b are fragmentary views of a modified magnetic circuit, also showing the magnet in two different positions.
Figure 6B:
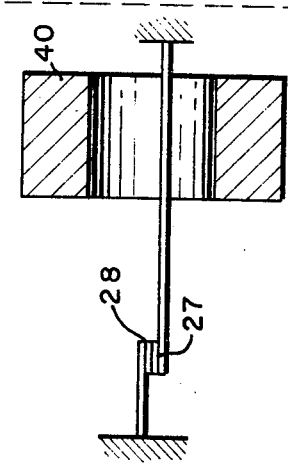

It has been discovered that reed switches may also be closed with a slightly different positioning of the magnet. For example, in FIGURE 6a the magnet is shown in a position slightly to the right of normally open switch contacts 27 and 28. When ion exchange body 34 contracts upon exposure to hard water, magnet 40 is repositioned farther away from contacts 27 and 28 as shown in FIG. 6b. It has been discovered that positioning the magnet as shown causes closure of the contacts. Therefore, the relative positioning of magnet 40 and reed switch contacts 27 and 28 may be arranged as shown in FIGS. 5a and 5b or in FIGS. 6a–6b whichever is desired.

Figure 7B:
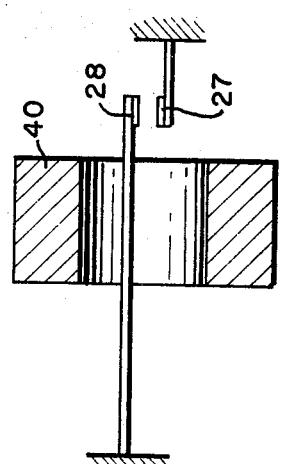

Another modification is possible if it is desired to provide a normally closed switch which is subsequently opened when hard water is sensed. Such an arrangement is shown in FIGS. 7a and 7b. In FIG. 7a magnet 40 is positioned remote with respect to contacts 27 and 28 in much the same manner as shown in FIG. 6b except that magnet 40 is now on the other side of the contacts and remote thereto such that it will be pulled toward the contacts when sensing element 34 contracts. As shown in FIG. 7a, with body 34 at its normal or large size, switch contacts 27 and 28 are closed. However, upon contracting due to exposure to hard water, body 34 repositions magnet 40 closer to the contacts, as shown in FIG. 7b, at which point the contacts are opened.

The embodiments of the invention in which an exclusive property or right is claimed are defined as follows:

1. A control device comprising:
   a sensing element a dimension of which undergoes a reversible change depending upon the ionic content of the water to which the element is exposed;
   an apertured magnet connected to the sensing element and movable from one position to another of two predetermined positions, each position being determined by and corresponding to the dimensional change of said sensing element, and
   a reed switch, including a pair of magnetically operable, electrical contacts, the switch being supported axially through the aperture of the magnet, the contacts being positioned with respect to the magnet such that they are open when the magnet is in said one position and closed when it is in said another position.

2. The device of claim 1 wherein the sensing element comprises a body of ion exchange material.

3. The device of claim 2 wherein the magnet is a ceramic material whereby the useful life of the ion exchange material is substantially increased.

4. The device of claim 1 including an elongated housing having inlet means in one end portion and outlet means in the other end portion and wherein:
   the sensing element is in the form of an elongated body;
   the housing encloses the sensing element, the magnet and the reed switch means with the switch supported near one end of the housing and the magnet connected to one end of the sensing element, the other end of the sensing element is secured near the other end of the housing.

5. The device of claim 4 wherein the inlet and outlet means include screens, the inlet screen being of a finer mesh than the outlet screen.

6. The device of claim 5 wherein the inlet and outlet means comprise openings in the housing wall and the screens cover the openings.

7. The device according to claim 4 wherein the housing has an opening in the one end and the switch is encapsulated in heat-shrink tubing, the tubing being inserted through the opening with a portion protruding exteriorly of the housing and heat-deformed at the protrusion, whereby the switch is positioned and supported in the housing.

8. The device of claim 4 wherein:
   the housing is cylindrical and has an opening in the end of the outlet portion;
   the sensing element is a generally cylindrical body of ion exchange material axially positioned in the housing with one end secured near the inlet portion of the housing and having a normal size when exposed to soft water and contracting to a smaller size when exposed to hard water;
   the magnet is a ring-shaped ceramic magnet;
   the switch is sealed in double-walled, heat-shrink tubing, a portion of the tubing being inserted through the one end opening with a portion protruding exteriorly of the housing and heat-deformed at the protrusion whereby the switch is positioned and supported inside the housing, and the switch and magnet are supported in a predetermined fixed position with respect to each other such that the switch contacts are normally open and positioned to the side of the magnet proximate the sensing element when the element is the normal size and closed when the element moves to a position such that the magnet encircles the contacts.

9. The device of claim 8 wherein the inlet and outlet means include screens, the inlet screen being of a finer mesh than the outlet screen.

10. The device of claim 1 wherein:

the sensing element is an elongated body having a normal size when exposed to soft water and contracting to a smaller size when exposed to hard water;

the magnet is connected to the one end of the sensing element and the other end of the sensing element is secured, and the switch contacts are normally open and positioned to the side of the magnet proximate the sensing element such that the switch is open when the element is the normal size and closed when the element moves the magnet to a position such that the contacts are within the aperture of the magnet.

References Cited

UNITED STATES PATENTS 3,250,392   5/1966   Luck _____ 210—96

JOHN W. ADEE, Primary Examiner

U.S. Cl. X.R.

200—61.04; 210—316